July 15, 1958    W. G. BROSENE, JR., ET AL    2,843,104
ADJUSTABLE BROILER
Filed Aug. 31, 1954    2 Sheets-Sheet 1
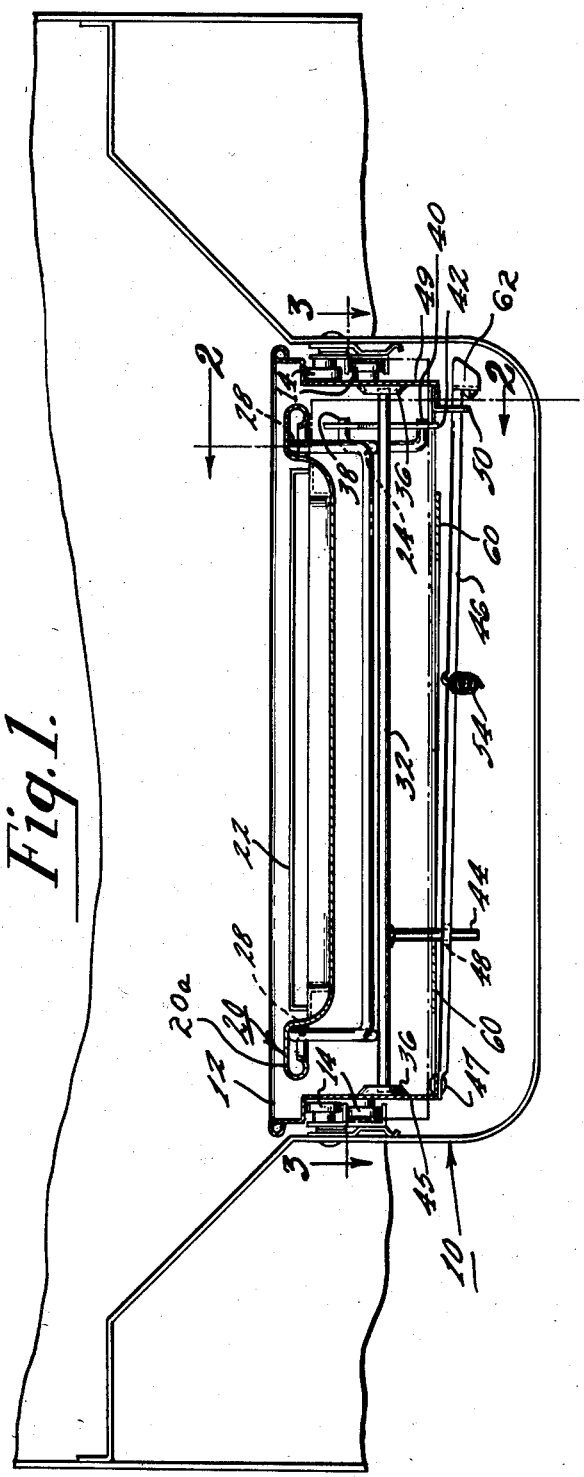
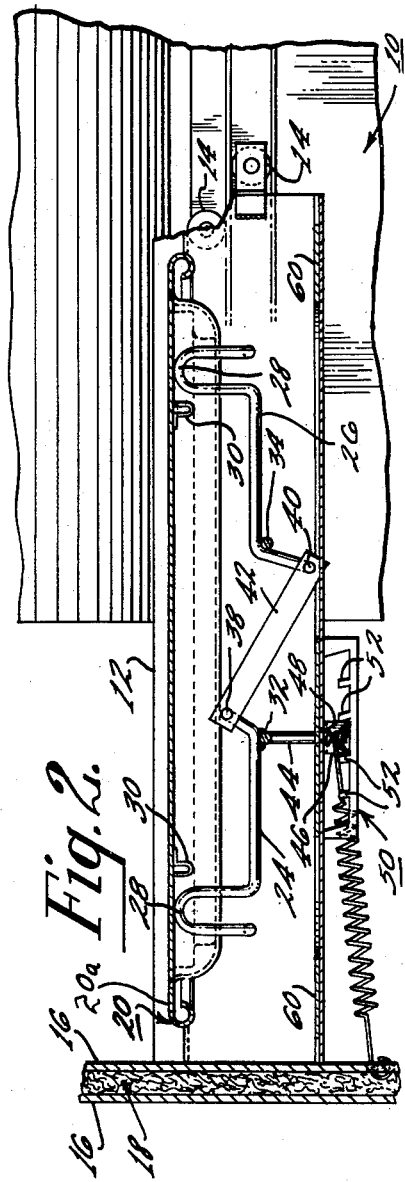
INVENTORS
*William G. Brosene, Jr.*
*& Laurence J. Mitter*
BY *Morris␣Rabkin*
ATTORNEY INVENTORS
William G. Brosene, Jr.
& Laurence J. Mitter
BY Morris A. Rakin
ATTORNEY

United States Patent Office 2,843,104
Patented July 15, 1958

2,843,104

ADJUSTABLE BROILER

William G. Brosene, Jr., Cincinnati, and Laurence J. Mitter, Hamilton, Ohio, assignors, by mesne assignments, to Whirlpool Corporation, a corporation of Delaware Application August 31, 1954, Serial No. 453,320

4 Claims. (Cl. 126—41)

This invention relates to adjustable broilers in cook stoves, and more particularly to broilers which may be adjusted without removal of the broiler pan from the stove.

In broiling food, it is advantageous to be able to vary the distance between the food and the heating element. A convenient method of doing this is to vary the height at which the broiler pan is supported.

In gas ranges, the broiler pan is usually mounted in a sliding drawer disposed below the oven burner. Some of these drawers have a series of parallel grooves arranged at predetermined levels. The pan may be inserted at a selected height within any pair of these grooves.

There have also been provided various mechanisms for adjusting the height of the pan without removing it from the drawer. These mechanisms, however, have been complicated in most cases and have added an appreciable amount to the cost of the stove, thereby tending to seriously diminish sales appeal. This invention provides a relatively economical mechanism of this type.

An object of this invention is to provide a relatively simple mechanism for adjusting the height of a broiler pan without removing it from the drawer.

Another object is to provide a mechanism of the aforementioned type which can be economically manufactured, assembled and installed.

In accordance with one form of this invention, the mechanism for adjusting the height of a pan in a broiler drawer has a pair of wing-shaped members. The four outer corners of these wing-shaped members are formed to provide projections for supporting the broiler pan. These wing-shaped members are rotatably mounted in bearings provided in the drawer. A link is engaged with projections extending horizontally from each of the wing-shaped members. A hand-operable lever is pivotally engaged with the drawer. A vertical extension is provided on one of the wing-shaped members. The lever has a slot for engaging the extension to rotate the wing-shaped member when the lever is manipulated in a horizontal direction. Rotation of one wing-shaped member causes both of these members, which are connected by the link to flap up and down in unison. The lever may be selectively placed in any one of a number of positions to maintain the wing-shaped members at a predetermined dihedral angle. Since the pan supporting projections are moved up and down in unison, the pan is levelly supported at a predetermined height for any one of these preselected positions.

Other objects and advantages of the present invention will become apparent to one skilled in the art from a reading of the following description in conjunction with the accompanying drawings of an illustrative embodiment of the teachings of the present invention in which:

Fig. 1 is a cross-sectional view in elevation of a portion of the lower-oven structure of a gas range having inserted therein a broiler drawer in which the illustrative mechanism is installed;

Fig. 2 is a cross-sectional view in elevation taken through Fig. 1 along the line 2—2 and looking in the direction of the arrows;

Figure 3:
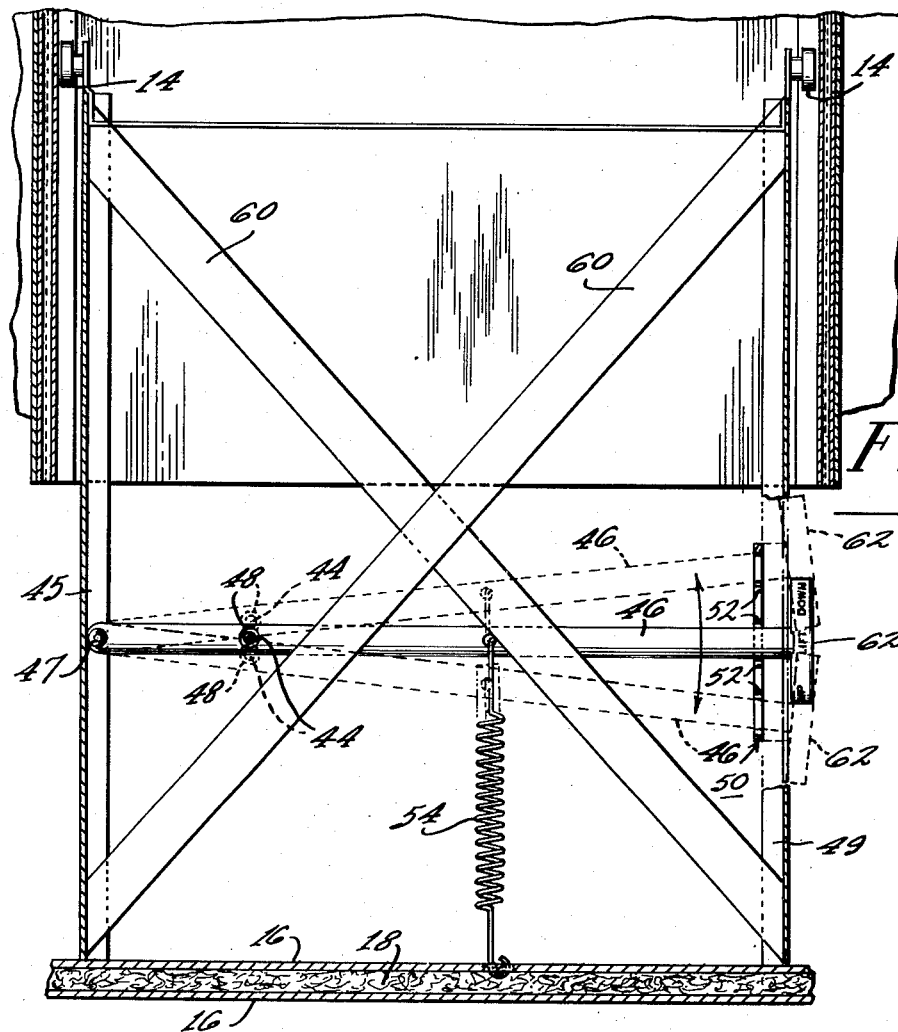
Fig. 3 is a plan view in cross section taken through Fig. 1 along the line 3—3 and looking in the direction of the arrows.

In Figs. 1 and 2 is shown the lower portion of an oven structure of a gas range 10 in which a broiler drawer 12 is installed. The drawer is supported on rollers 14 so that it may be slid in or out of the oven structure. A well known gas burner or heating element (not shown) may be mounted in the usual manner within the oven structure above the broiler drawer. The front portion of the drawer may be insulated against transfer of heat by being constructed of a pair of structural sheets 16, which may be sheet steel, enclosing a filler of heat insulating material 18 (for example, glass wool). A broiler pan 20 is supported within the drawer. The pan may include a rack 22 for supporting the food and holding it clear of the juices which drip into the pan during the broiling operation.

The pan 20 is supported by a pair of wing-shaped members 24 and 26. The outer corners of the wing-shaped members are formed to provide projections 28. These projections provide a means for supporting the broiler pan. These wing-shaped members are conveniently made, for example, of steel rod which is formed to provide means for supporting the pan as well as to provide portions of a rotatable linkage for varying the height of the pan. Other types of material (for example, sheet steel) may be used to fabricate the wings within the spirit of the present invention.

The pan may include means for centering it over the projections 28 provided by the wing-shaped members. Brackets 30, for example, may be spot welded to the underside of the lip or peripheral flange 20a of the pan 20. The projections 28 extend upwardly adjacent the sides of the dished portion of the pan so that the pan is held or cradled between these projections and the co-operating brackets or stops 30. As will be clear from Figures 1 and 2, pan 20 is dished downward for the major portion of its area and is provided at its top with a peripheral flange or lip 20a which seats on the projections 28 for supporting the pan in the manner stated. The projections 28 restrain pan 20 against movement lengthwise of rods 32 and 34 and, in cooperation with the brackets or abutment members 30, also restrain it against movement transversely of rods 32 and 34. That assures proper positioning of pan 20 and effectively guards against displacement thereof.

The wing-shaped members 24 and 26 are secured to horizontal parallel rods 32 and 34 respectively. These members may be secured to the rods by any well known fastening process, such as welding. The rods are rotatably engaged with the sides of the drawer within bearing holes provided within inwardly dished indentations 36 provided in the sides of the drawer. These inwardly dished indentations provide recesses for convenient fastening means such as lock rings (not shown). This insures that the fasteners do not protrude to interfere with inward and outward movement of the drawer.

The portion of member 24 adjacent rod 32 has an extension 38 which is disposed parallel to and above rod 32. The portion of member 26 adjacent rod 34 has a projection 40 which extends parallel to and below rod 34. A link 42 has a pair of holes within which these extensions are inserted. The extensions may be conveniently rotatably secured within these holes by lock rings or cotter pins (not shown). A vertically disposed stud or extension 44 is secured, for example, by welding, to rod 32 at a point approximately one-quarter the distance from one side 45 of the drawer. A hand operable lever 46 is pivoted to this same side of the drawer by means of a loose rivet 47. The lever has a slot 48 which is large enough to loosely receive extension 44. Extension 44 is engaged with this lever by insertion within this slot. An operating handle 62 may be attached to the end of the lever remote from the pivot.

The other side 49 of the drawer has a member 50 including a horizontal guide slot. This slot has a number of projections or teeth 52 providing, for example, five fixed positions to which the lever may be manipulated horizontally backward and forward. A spring 54 is connected from the front of the drawer approximately to the center of the lever 46. The spring counterbalances the weight of the pan, the food and the operating mechanism. It also provides a downwardly-acting component of force which positively engages the operating lever in any selected position.

Fig. 3 is a plan view in cross section of the drawer as it is withdrawn a distance from the oven structure. It clearly shows how the drawer is made of an economical open construction. A pair of cross members 60 take the place of the usual closed bottom of the drawer to maintain the drawer rigidly braced. The hand-operable lever 46 is clearly shown in its mid-position within slotted member 50. Extreme forward and backward positions of the lever are shown in phantom. The position of spring 54 is also clearly shown in Fig. 3. The horizontal bar or handle 62 is fixed to the free end of the lever 46. It may, for example, be made of colored plastic and include operating instructions. These instructions give directions for lifting to disengage from the projections of the slotted member, and directions of movement for raising and lowering the pan. This bar provides a grip so that the lever may be easily manipulated to any of the preselected positions.

Figure 4:
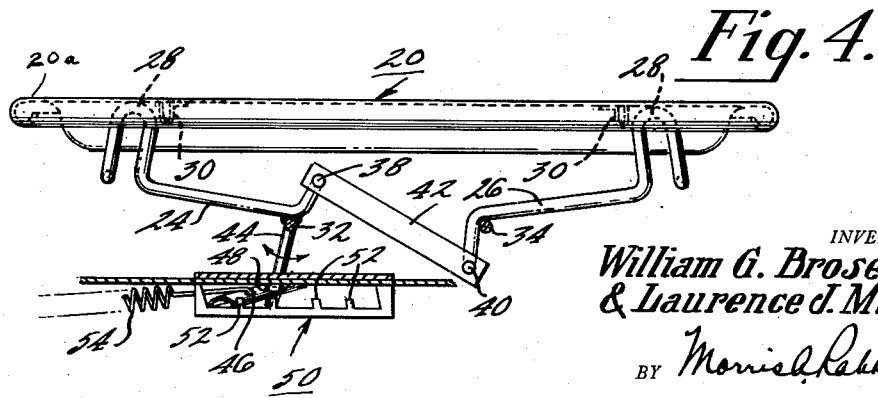
Fig. 4 is a fragmentary view in elevation of a portion of the mechanism shown in Fig. 2 showing the mechanism adjusted to hold the pan in an elevated position.

In Fig. 4, a portion of the mechanism shown in Fig. 2 is illustrated in the fully raised position. The operation of the mechanism to raise the pan to this position is as follows:

When the lever is moved horizontally backwards and forwards, the stud 44 inserted within slot 48 is rotated counterclockwise and clockwise. Since extension or stud 44 is secured to rod 32, rod 32 also rotates accordingly. Rod 32, in turn, is secured to wing-shaped member 24. Wing-shaped member 24 is, therefore, accordingly rotated by movement of the lever. Wing-shaped member 24 may also be fabricated in a manner to include rod 32.

Link 42 is rotatably engaged with the extending portions 38 and 40 of wing-shaped members 24 and 26 respectively. Rotation of wing-shaped member 24, therefore, produces opposite rotation of wing-shaped member 26. As the lever 46 is moved forward and backward, the wing-shaped members, therefore, move in unison upward and downward in a flapping motion. The dihedral angle between the wings is, accordingly, selectively varied. This motion may be described as similar to the flapping of a bird's wings.

The spring 54 is connected in a manner to assist in flapping the wings upward. As previously discussed, the spring acts in a direction to help raise a load of food in the pan. The lever mechanism is also pivoted in a manner to permit its mechanical advantage to assist in raising a loaded pan.

The horizontally slotted member 50, as shown, has four projections or teeth 52 providing five positions within which the lever 46 may be selectively engaged. The pan may be, therefore, selectively positioned at five predetermined heights.

An embodiment of this invention has been herein described which permits selective adjustment of the height of a broiler pan without removing it from the drawer. This illustrated mechanism may be economically manufactured, assembled and installed. It is also well adapted for manufacture by modern mass production methods.

What is claimed is:

1. A mechanism for adjusting the height of a pan in a broiler drawer comprising a pair of parallel rods rotatably mounted in said drawer, a pair of wing-shaped members secured to said rods, the upper corners of said wing-shaped members being shaped to provide projections for supporting said pan, one of said wing-shaped members having a horizontal projection disposed parallel to and above said rods, the other of said wing-shaped members having a horizontal projection disposed parallel to and below said rods, a link rotatably engaged with each of said horizontal projections to cause said wing-shaped members to flap up and down in unison, an extension on one of said rods, and a hand-operable lever having a slot for engaging said extension to rotate its associated wing-shaped member and rod when said lever is manipulated backwards and forwards.

2. A mechanism for adjusting the height of a pan in a broiler drawer comprising a pair of parallel rods rotatably mounted in said drawer, a pair of wing-shaped members, adjacent portions of said members being secured to said rods, the upper corners of said wing-shaped members being shaped to provide projections for supporting said pan, said wing-shaped members each having a horizontal projection extending parallel to said rods eccentric thereto and at opposite sides thereof, a link coupling said horizontal projections to form an assembly of wing-shaped members which flap up and down in unison, a hand-operable lever connected to rotate one of said members to cause said wing-shaped members to flap when said lever is manipulated, and spring means connected to said assembly and disposed to urge said assembly in an upward direction.

3. In combination with a broiler drawer, a mechanism for selectively adjusting a pan in said broiler drawer to predetermined heights comprising a pair of parallel rods rotatably mounted in said drawer, a pair of wing-shaped members having adjacent portions secured to said rods, the upper corners of said wing-shaped members being shaped to provide projections for supporting said pan, one of said wing-shaped members having a horizontal projection disposed parallel to and above said rods, the other of said wing-shaped members having a horizontal projection disposed parallel to and below said rods, a link coupling said horizontal projections to cause said wing-shaped members to flap up and down in unison, an extension on one of said wing-shaped members, a hand-operable lever connected by means of a pivot to a side of said drawer, said lever having a slot for engaging said extension to rotate its said wing-shaped member about its rod when said lever is manipulated backwards and forwards, and a horizontally slotted member disposed upon the other side of said drawer, the end of said lever remote from said pivot being inserted through said slotted member, said slotted member providing means for maintaining said lever at predetermined positions to maintain said pan at said predetermined heights.

4. In means for adjusting the height of a pan in an oven broiler drawer, an oven, a removable broiler drawer mounted in said oven, a broiler pan dished downward for the major portion of its area and provided with an upper outwardly extending peripheral flange, a pair of parallel rods rockably mounted in said drawer, a pair of wing-shaped members secured on said rods, the latter and said members underlying said pan, said members having upward projections disposed adjacent the sides of said dished portion of said pan restraining the latter against relative movement lengthwise of said rods and said flange seating on said projections, abutments on said pan adjacent said projections and in cooperation therewith restraining said pan against movement relative to said projections and transversely of said rods, one of said wing-shaped members having a horizontal projection disposed substantially parallel to and above said rods and the other wing-shaped member having a similar projection disposed below said rods, a link connecting said horizontal projections for rocking said wing-shaped members in opposite directions, an extension on one of said rods, and an operating lever having a slot receiving said extension for rocking said one rod and its associated wing-shaped member.

References Cited in the file of this patent

UNITED STATES PATENTS

| | | |
|---|---|---|
| 99,633 | Cramer | Aug. 1, 1911 |
| 1,941,301 | Hanson et al. | Dec. 26, 1933 |
| 2,119,898 | Weston | June 7, 1938 |
| 2,135,309 | Leonard | Nov. 1, 1938 |
| 2,787,381 | Hallock | Apr. 2, 1957 |